United States Patent Office 3,119,691
Patented Jan. 28, 1964

3,119,691
NOVEL FARINACEOUS ANIMAL FOOD
Varnum D. Ludington, Greenwich, Conn., Robert E. Schara, Battle Creek, Mich., and Raymond E. Mohlie, Scituate, Mass., assignors to General Foods Corporation, White Plains, N.Y., a corporation of Delaware
No Drawing. Filed Apr. 23, 1962, Ser. No. 189,310
13 Claims. (Cl. 99—2)

This invention relates to a novel food for animals and to a method of making the same. More specifically, it relates to a novel dog food particularly characterized by its ready hydratability, its retention of particle identity during and after hydration, and by its ability to give a gravy-containing mixture on moistening.

As is well known to those skilled in the art, animal foods, and particularly dog foods, are commonly prepared for the consumer in two forms; the meal type particularly characterized by its dry more-or-less cereal-like texture and by its low moisture content, typically about 10%; and the canned type particularly characterized by its more-or-less meat-like texture and by its high moisture content, typically as high as 75%.

Although the canned type of dog food generally has a very high degree of palatability, i.e., receptivity by dogs, it is characterized by poor storage characteristics and comparatively low nutritional value. On the other hand, the meal type animal food, while eminently superior with respect to these characteristics, is commonly found to possess low palatability. In many cases, the animal will not eat it in dry form, and it becomes necessary to add liquids thereto.

Although prior art meal type foods may be readily enough moistened, they commonly become mushy or doughy and stick to the plate. A food which possesses these characteristics is not palatable to animals, and they may not consume enough to provide the proper nutritional intake. Thus, because of the undesirable physical properties of such foods, their superior nutritional features are not made available to the animal. Attempts have been made to raise the palatability as by incorporating a gravy-forming ingredient into the mixture, but these attempts have been unsuccesful. It has been found that addition of water to these products still gives a doughy mixture which is not palatable to animals.

It is an object of this invention to prepare a novel type animal food which can form a gravy-containing mixture on addition of water, and which is characterized by a very high degree of palatability, by a high nutritional content, by ready hydratability, and by retention of particulate character on hydration.

In accordance with certain aspects of this invention, a hydratable animal food particularly characterized by its ability to form a gravy-containing mixture on addition of liquid may be prepared by the process comprising gelatinizing and expanding a body of particles of a farinaceous animal food, coating said particles of animal food with a fat, controlling the temperature of said particles and said fat during said coating whereby said fat forms a coating on the surface of said particles, and contacting said fat with a dry gravy-forming agent capable of rapid dispersion and increase in viscosity upon addition of said liquid thereto, thereby producing a dry farinaceous fat-containing animal food capable of forming a gravy-containing mixture on addition of water, which mixture does not prematurely turn soggy or mushy.

In accordance with certain of the more specific aspects of this invention, a hydratable animal food characterized by gravy-forming ability, high water adsorptivity, rapid rate of absorption, and the ability of the product to retain its individual particulate shape on wetting, may be prepared by the process which comprises forming a farinaceous mixture, including a farinaceous starch-containing grain material and proteinaceous ingredients to balance said mixture nutritionally, the level of the farinaceous and proteinaceous ingredients constituting a substantial majority of the ingredients of the farinaceous mixture; causing the farinaceous mixture to be transformed into an expanded shaped mass having a porous outer surface and a plurality of holes distributed throughout by moistening the farinaceous mixture, gelatinizing the farinaceous mixture by heating it to cause starch granules in the mix to swell under the influence of increased moisture and heat, and completing gelatinization by extruding it from a confined zone of high pressure wherein it is at a temperature substantially above 212° F. through an extrusion orifice against the back pressure thereof to a zone of low pressure whereby the product expands to a lower density product and its moisture content is reduced; then further drying the lower density product to a stable moisture content and coating the dried product with a liquefied fat and a gravy-forming agent; the relative temperature of the fat and the fat-contacted product is so regulated that the fat is fluid prior to its formation of a coating and solidifies after it contacts the product, but only slightly penetrates the porous outer surface thereof, the interior of the product being thereby rendered free of fat coating.

The gravy-forming agent should be of a character, like those described subsequently in this application, such that when it is mixed with aqueous liquid, the mixture rapidly thickens and increases in viscosity, whereby the gravy forming agent, through its location on the surface of the product will cause the aqueous liquid to be absorbed by the product at a controlled rate such that the porous expanded animal food does not prematurely lose its desired crunchy texture. Thus, by rendering the gravy-making or thickening ingredients readily available to produce this effect, the thickened gravy produced upon liquid addition coats the surface of the product in such a manner as achieves this controlled rehydration. By having the fat coating located on the surface with the dry gravy-forming agent, the fat contributes to control of the hydration in providing the desired crunchy texture and also serves as an effective carrier for the dry gravy-making ingredients, making them available for dispersion into the liquid to produce a thickened gravy which is ultimately to be absorbed and provide the hydrated animal food.

The farinaceous animal food which may be treated in accordance with the instant invention to yield a gravy-forming product may be formulated according to various techniques. Preferably it may be formed from a farinaceous mixture containing a farinaceous ingredient, and a proteinaceous ingredient, and preferably also flavor ingredients, coloring ingredients, fibrous ingredients, and nutritive supplements including vitamins.

The farinaceous mixture will include a primary farinaceous ingredient which may be any of the more common grains, such as corn, wheat, barley, oats, etc., and their derivatives, including, e.g., corn meal, red dog flour, wheat germ, etc. A preferred farinaceous ingredient may include hominy. Commonly this ingredient will be present in amount of 30%–65% of the total mass.

In the preferred embodiment, the farinaceous mixture may also include one or more proteinaceous ingredients of vegetable, animal or fish origin, typically soy bean meal, meat meal, or fish scrap. This ingredient, preferably present in amount of 25%–40% of the total mixture, will provide the bulk of the desired protein content in the final product. In the preferred embodiment, the ratio of farinaceous ingredient to proteinaceous ingredient may be 2.5–0.8 say 1:1. The farinaceous ingredient and the proteinaceous ingredient together may comprise 55%–95% of the total mixture.

It will be apparent that the proteinaceous ingredient will preferably be selected to provide both the necessary level or amount of protein and also the necessary composition. Preferably several proteinaceous ingredients will be present. More specifically, these ingredients will be selected to be complementary to each other and to the farinaceous ingredient whereby the final mixture is balanced with respect to desired amino acids. For example, the protein of corn is low in tryptophane, an essential amino acid, whereas fish meal is high in this component; similarly wheat is low in lycine whereas meat meal will provide this ingredient. Accordingly mixtures of these complementary ingredients will preferably be used to provide the desired balance.

Other preferred ingredients in the product (typically present in total amount of 0.25%–6% or 7%) may include: desired flavor ingredients typified by fish scrap (when this material is not used as the prime source of protein) or salt; coloring ingredients including iron oxide, etc.; fibrous ingredients typified by beet pulp; and desired vitamins.

A typical specific embodiment of the product may be prepared from the following farinaceous mixture.

Ingredient:

| Ingredient | Percent |
|---|---|
| Farinaceous ingredient— | |
| Wheat flour middlings | 12 |
| Corn germ meal | 10 |
| Hominy feed | 40 |
| Proteinaceous ingredient— | |
| Soy bean meal | 15 |
| Meat meal | 15 |
| Wheat germ meal | 3 |
| Dried milk | 0.9 |
| Fibrous ingredient—Beet pulp | 1.8 |
| Flavor ingredient— | |
| Fish scrap | 0.7 |
| Salt | 0.5 |
| Vitamins, minerals | q.s. |

The farinaceous mixture may typically have a moisture content of about 9%–10%. In accordance with this invention, the moisture content of the mixture will be raised preferably to 28%–31% and the starch in the mixture may be partially gelatinized. The moisture content may be raised by adding cold water, hot water, or steam prior to completion of the partial gelatinization step. Partial gelatinization may be effected by addition of appropriate amounts of water, including steam as noted, and by maintaining the mixture at 200° F.–220° F., typically 212° F. at about atmospheric pressure for about 30–120 seconds.

In the preferred embodiment, this partial gelatinization of the charge may be effected in a steamer and the increase in water content from 9%–10% up to 28%–31% may be effected by the water which is added during the steaming (as condensate) as well as by the water which may have been added immediately prior to the gelatinizing steps; typically the final moisture content of the partially gelatinized product may have been derived from equal parts of native water, condensate, and added water.

Partial gelatinization may be effected in a Beale tube which is typical of several types of closed paddle mixers, in which the material may be subjected to contact with both indirect and direct steam. During the partial gelatinization, whether it be conducted in a Beale tube or in a steamer such as the FMC steamer, or in any other desired equipment, the starch granules within the mixture will swell under the influence of the increased moisture and heat. The course of the partial gelatinization may be followed by observing the individual starch granules when illuminated by polarized light and viewed through a microscope. As the reaction proceeds, the granules will swell and it will be noted that the so-called Maltese-cross configurations within the granules will substantially entirely disappear. However, in the preferred embodiment there will be very few, if any, of the starch cells which will have ruptured.

Further treating of the partially gelatinized product includes mechanical working of the material and expanding. Preferably and commonly this is effected in an extrusion operation. During mechanical working, the partially gelatinized, swollen, unruptured particles are subjected to a high degree of mechanical work and shearing. Steam may be employed to control the temperature. The conditions within this high pressure extrusion operation may be such that the temperature is well above 212° F.; the pressure may be very high.

The gelatinization may be completed under the influence of the pressure and heat and high pressure steam may be injected into the mixture. The product is then extruded from the apparatus through a die of desired shape. Because of the conditions prevailing in the process, including the high temperatures and pressures resulting wholly or in part from the mechanical work and in part from the injected high pressure steam, considerable expansion of the product may occur during the extrusion step as the material passes through the discharge orifice.

The degree of expansion of the product may be controlled by regulating the pressure drop across the orifice; preferably this will be done by regulating the back pressure which in turn may be regulated by the throughput and/or the size and number of holes in the orifice; and the moisture content of the material. During the expansion or extrusion, the moisture content of the material may be reduced typically by 2%–5% to a level of about 23%–29%.

Expansion from the higher pressure behind the orifice to the lower pressure on the discharge side of the orifice permits attainment of the expanded product which is characterized by its comparatively low density and by the presence of a plurality of air holes or pockets uniformly distributed throughout the mass.

The so-extruded or expanded material may be subdivided or cut to desired size or form. If it be desired to produce a relatively smooth-surfaced, highly regular particle, or one which is characterized by ragged and non-uniform appearance, or variations in between, this may readily be effected by varying the conditions of cut. For example, a sharp, closely fitting knife will produce regular particles, while a dull knife spaced from the orifice will tend to tear the particles and give a ragged or irregular product.

The particles of material may be dried from its moisture content of 23%–29% down to a stable moisture content of 8%–9%. This may typically be effected by heating to elevated temperature less than 300° F. Preferably the temperature of drying will be about 225° F. to 275° F., say 250° F. and the time of drying will be about 20 minutes–5 minutes, preferably 10 minutes. Drying of the particles may be effected at room temperature, but under these conditions the time of drying might be as long as 18 hours. The palatability of the product may be undesirably low if the drying is effected at temperatures about or above 300° F.

The so-dried particles may be cooled to ambient temperatures as by contact with a stream of cool air for a period of 3 to 5 minutes.

Preparation of the novel gravy-forming product of this invention may be accomplished preferably when the so-dried particles are cool. Although the temperature of these particles may vary, as hereinafter noted, they will preferably be at about ambient temperature, preferably at 60° F.–80° F.

The preferred fats which may be employed in practice of this invention include those which are solid at ambient temperature, e.g., at 60° F.–80° F., and which may be rendered fluid when warm, e.g., at temperature of 110° F.–140° F. The preferred fat which may be employed may be prime grade tallow which may be stabilized against rancidity if desired. The fat is preferably employed in amount of 1.5%–4% by weight of the particles.

Coating of the particles with the fat may preferably be effected by spraying the fat in the form of a fine mist or spray, together with air if desired. During the coating the individual particles may be kept in motion. Coating can be done, e.g., in a rotating drum which continually exposes fresh particle surfaces to the fat.

It is preferred to coat the particles, preferably at the same time as the fat is coated thereon, with a flavoring component, preferably a liquid meat extract. This may be sprayed onto the particles at the same time as the fat is sprayed. Commonly the amount of flavoring component may be .25% to 5%, say 0.5% of the weight of the particles. The liquid meat extract may be dispersed in the fat prior to its being sprayed, or alternatively may be sprayed on the product subsequent to spraying the fat.

During the coating, the relative temperature of the farinaceous particles and the fat are controlled so that: (a) the fat is sufficiently fluid to be coated onto the particles and to form thereon a more-or-less continuous coating; (b) the fat penetrates only slightly into the interior of the particle and preferably forms a coating on the surface thereof; and (c) the fat solidifies substantially entirely as it hits the particle of food.

Because of the porous nature of the particles, the sprayed fat will pentrate the outer surface thereof, but because of the controlled temperatures of the particles and the fat, the latter will solidfy before it has penetrated more than the layer immediately adjacent to the surface. Thus the interior of the particle will preferably be free of fat while the exterior portion may contain a solid layer thereon.

Preferably immediately after the fat has been sprayed onto the particles, they are contacted with a dry gravy-former, although the gravy-former may also be dispersed in the fat being sprayed in a hydrated or dry state or applied in either such form, i.e., as a liquid or a powder, to the expanded product prior to application of the fat thereon. The preferred gravy-former may be gums. Typical of the gravy-formers which may be employed are gum guar (in amounts of 1%–1.5%), gum tragacanth (in amounts of 0.75%–4%), gum karaya (in amounts of 0.75%–2%), locust bean gum (in amounts of 1–5%), pregelatinized corn flour (in amounts of, e.g., 0.75%), pregelatinized starch (in amounts up to 5%), precooked potato flour (in amounts up to 5%), hydrocolloids such as alginates (in amounts up to 2%) and carrageenins (in the levels of 0.75–2.0%), polymerized alkylene oxides such as ethylene oxide (at levels of 0.025%–0.1%).

When pregelatinized starch is employed, it is preferred to use it in combination with carboxy methyl cellulose, preferably 0.75% of each.

The gravy-former provides a coating on the particles which prevents them from adhering to each other whereby the body of particles may be free flowing. The gravy-former should be of a type which hydrates rapidly and is capable of readily thickening the liquid to be absorbed by the product. All of the foregoing listed gravy formers are capable of performing this function in that they thicken to a desired viscosity in a period less than 5 minutes and thereby permit the thickened gravy produced upon liquid addition to coat the surface of the expanded dog food in such a manner as achieves controlled rehydration thereof and forestalls premature softening of the expanded porous animal food. In this connection also the fat, by virtue of its liquefiable condition at the anticipated temperatures of use in producing a gravy through the addition of an aqueous liquid, serves as a carrier for the dry gravy-making ingredients or thickeners listed above.

It has been found that of the various dry gravy-forming agents of use, the carboxy methyl cellulose is a preferred agent being water soluble and capable of assuming the required viscosity to offer a truly "instant" character to the sauce or gravy-producing ingredient.

It is a particular feature of this product that it may be wet with 1 to 3, say 2 parts by weight of liquor (equivalent to .5 to 1.5, say 0.66 part by volume), preferably water, at, e.g., 100° F. to 140° F., say 120° F., to form a gravy-containing mixture, although liquids at temperatures as low as 50–60° F. will form the gravy albeit more slowly. Other liquors which may be employed include milk soups, consommes, etc.

After addition of the preferably warm liquor, the mixture may be stirred. As it is stirred, the gravy is formed and the particles or chunks of farinaceous material retain their integrity during and after the formation of the gravy.

It is a particular feature of this novel product that when rehydrated, the individual particles retain their shape and do not become sticky or gummy. This high degree of particle integrity contributes greatly to the high palatability of the product. It is also a feature of the product that the liquid adsorption is rapid even at room temperature, i.e., even when the product is contacted with cold tap water.

In accordance with a specific embodiment of this invention, a mixture of the following components was employed as charge.

| Ingredients: | Percent |
|---|---|
| Hominy feed | 37 |
| Wheat grey shorts | 13 |
| Corn germ meal | 9.6 |
| Solvent soya | 16 |
| 52% meat meal | 17 |
| Wheat germ meal | 3 |
| Dried milk | 0.9 |
| Beet pulp | 1.7 |
| Fish scrap | .7 |
| Brewer's yeast | 0.5 |
| Salt | 0.5 |
| Vitamins and minerals | 0.1 |

In this specific example, 100 parts by weight of those charge materials containing 9% water was placed within a Beale tube, wherein it was maintained for two minutes at 212° F. During this time, 10 parts of 70° F. water were added and steam was directly passed to the mixture.

The temperature was maintained both by the steam passed directly to the mixture as well as by steam in the jacket. During the entire two minutes, the mixture was vigorously agitated. The moisture content of the material at the end of the two minutes was 30%.

The mixture was then placed in a Wenger extruder which extruded the so-treated material at high pressure. The product, which came out of the extrusion die, was in the form of a rope having a density of 16 lbs. per cubic foot. This material looked similar to angel food cake and had more-or-less oriented cells or air pockets. It was cut to desired length of about ¾". The cut rope was then maintained for 10 minutes in the traveling bed drier through which hot air at 250° F. was passed. The dried particles were cooled by ambient air during a period of 3 minutes to give a product having a density of 18–20 lbs./ft.³.

The so-prepared particles at temperature of about 70° F. were placed in a rotating drum. Prime grade beef tallow at 125° F., in amount of about 4 pounds per 100 pounds of particles, was sprayed onto the particles as the drum rotated. Spraying was effected with a pump operating at 100 p.s.i.g. through a fine nozzle. Simultaneously and separately, a meat flavor stock (which had been prepared by heating beef in water for 2–3 hours) was sprayed onto the particles in amount of about 0.6 pound per 100 pounds of particles.

When these had been added to the particles, a dry gravy-forming mixture which had been prepared by mixing about one pound of precooked potato flour and two pounds of guar gum, was blown onto the particles. When the mixture was homogeneous, mixing was stopped.

One part by weight of this product was added to two parts by weight of warm (110° F.) water. The mixture was stirred for about 30 seconds to distribute the water throughout the mass. Gravy formed almost instantly. The mixture was not mushy or soggy; each of the individual particles of food retained its discreteness. The gravy-containing product was found to be very highly palatable when given to dogs.

The present application is filed as a continuation-in-part of our prior application Serial No. 3,516, filed January 20, 1960, and entitled, "Novel Farinaceous Animal Food," now abandoned.

While the present invention has been described with particular reference to specific examples, it will be apparent to those skilled in the art that various changes and modifications may be made thereto.

What is claimed is:

1. The method of preparing a particulate dry animal food capable of forming a gravy-containing mixture on addition of aqueous liquid while retaining its individual particulate state without becoming mushy and sticky, said method comprising the steps of forming a farinaceous mixture including farinaceous starch-containing grain material and proteinaceous material to balance said mixture nutritionally, the amount of said grain material being between 30% and 65% and the amount of said proteinaceous material being between 25% and 40% by weight of said farinaceous mixture;

gelatinizing said farinaceous mixture by moistening and heating it to cause starch granules in said mixture to swell with accompanying loss of bi-refringence;

subjecting the gelatinized mixture to mechanical working and expansion by extruding it from a confined zone of high pressure and temperature substantially above 212° F. to a zone of lower pressure, thereby forming said mixture into an expanded porous structure of lower density and reducing its moisture content;

drying said lower density product to a stable moisture content; and cooling the dried product and coating its surface with a fat and dry gravy-forming and thickening material capable of rapid reconstitution in water, the relative temperature of said dried product and coating fat being such that the fat forms a surface coating when applied to said dried product;

said coating maintaining said material on said surface available for rapid hydration by added aqueous liquid and also retarding hydration of the expanded porous structure of the product by said liquid during reconstitution of said gravy.

2. The method of preparing a particulate dry animal food capable of forming a gravy-containing mixture on addition of aqueous liquid while retaining its individual particulate state without becoming mushy and sticky, said method comprising the steps of forming a farinaceous mixture including between 30% and 65% farinaceous starch-containing grain material and between 25% and 40% proteinaceous material to balance said mixture nutritionally;

gelatinizing said farinaceous mixture by moistening and heating it and contacting steam therewith to cause starch granules in said mixture to swell with accompanying loss of bi-refringence;

subjecting the gelatinized mixture to mechanical working and expansion by extruding it from a confined zone of high pressure and temperature substantially above 212° F. to a zone of lower pressure, thereby forming said mixture into an expanded porous structure of lower density and reducing its moisture content;

drying said lower density product to a stable moisture content; and cooling the dried product and coating the cooled product with a liquid fat which is normally solid at ambient temperature, liquid meat extract, and dry gravy-forming and thickening material capable of rapid reconstitution in water;

the relative temperatures of said cooled product and said fat being such that said fat solidifies rapidly on the surface of said product to form a coating thereon which maintains said extract and said material on said surface available for rapid hydration by added aqueous liquid and also retards hydration of the expanded porous structure by said liquid during reconstitution of said gravy.

3. The method of preparing a particulate dry animal food capable of forming a gravy-containing food on addition of aqueous liquid while retaining its individual particulate state without becoming mushy and sticky, said method comprising the steps of forming a farinaceous mixture including between 30% and 65% farinaceous starch-containing grain material and between 25% and 40% proteinaceous material to balance said mixture nutritionally;

gelatinizing said farinaceous mixture by moistening and heating it to cause starch granules in said mixture to swell with accompanying loss of bi-refringence;

subjecting the gelatinized mixture to mechanical working and expansion by extruding the heated mixture from a confined zone of superatomspheric pressure and temperature substantially above 212° F. to a zone of atmospheric pressure, thereby forming said mixture into an expanded porous structure of lower density and reducing its moisture content;

drying said lower density product at a temperature less than 300° F. to a stable moisture content;

cooling the dried product and coating the cooled product with 1.5–4.0% by weight of fluid fat which is solid at ambient temperature and is capable of being rendered fluid at a temperature of 110° F. and with 0.25–5% by weight of liquid meat extract;

the relative temperatures of said cooled product and said fat being such that said fat solidifies rapidly on the surface of said product to form a coating thereon which retards hydration of the expanded porous structure of the product;

and applying to the outer surfaces of said fat coating a dry gravy-forming and thickening material capable of rapid reconstitution on addition of aqueous liquid to said product.

4. The method of preparing a particulate dry animal food capable of forming a gravy-containing food on addition of aqueous liquid while retaining its individual particulate state without becoming mushy and sticky, said method comprising the steps of forming a farinaceous mixture including farinaceous starch-containing grain material and proteinaceous material to balance said mixture nutritionally, the weight ratio of farinaceous grain material to proteinaceous material ranging between 2.5:1 and 0.8:1 and the amount of farinaceous grain material being between 30% and 65% and of the proteinaceous material between 25% and 40% by weight of said farinaceous mixture;

gelatinizing said farinaceous mixture by moistening and heating it to cause starch granules in said mixture to swell with corresponding loss of bi-refringence;

subjecting the gelatinized mixture to mechanical working and expansion by extruding it from a confined zone of high pressure and temperature substantially above 212° F. to a zone of lower pressure, thereby forming said mixture into an expanded porous structure of lower density and reducing its moisture content by 2–5% to a level of about 23–29%;

drying said lower density product at a temperature less than 300° F. to a stable moisture content;

cooling the dried product and coating the cooled product with (a) 1.5–4.0% by weight of fluid fat which is solid at temperatures of 60°–80° F. and is capable of being rendered fluid at a temperature of 110° F. and (b) 0.25–5.0% by weight of dry gravy-forming and thickening material capable of rapid reconstitution in water;

the relative temperatures of said fat and of said cooled product being such that said fat solidifies rapidly on the surface of said product and forms a coating thereon which maintains said material on said surface available for rapid hydration by added aqueous liquid and also retards hydration of the expanded porous structure of the product by said liquid during reconstitution of said gravy.

5. Method according to claim 1, wherein 0.25–5% liquefied meat extract by weight of the dried product is coated on the dried product with the fat and dry gravy-forming agent.

6. Method according to claim 1, wherein the fat coating is applied by spraying and the product being coated is kept in motion during the coating process to continually expose fresh product surfaces to the fat.

7. Method according to claim 5, wherein the liquid meat extract is sprayed onto the product at the same time as the fat is sprayed, the product being at ambient temperature.

8. Method according to claim 7, wherein the gravy-forming agent is applied as a dry powder after the fat has been sprayed onto the dried product.

9. Method according to claim 8, wherein said lower density product is dried at a temperature between 225°–275° F. for a period ranging from 20 to 5 minutes prior to contacting it with liquefied fat.

10. Method according to claim 9, wherein the gravy-forming agent contains a water soluble cellulose derivative.

11. Method according to claim 10, wherein the cellulose derivative is carboxy methyl cellulose.

12. A readily hydratable animal food particularly characterized by its high water adsorptivity, rapid rate of adsorption, ability to retain its particulate shape on wetting and ability to form a gravy-containing mixture on addition of aqueous liquid which comprises a particulate mass of a gelatinized expanded farinaceous material, a layer of fat solid at ambient temperature in the range of 60° F. to 80° F. but liquefiable upon the addition of warm aqueous liquid to form a gravy and a quantity of dry gravy-forming agent on said layer of fat, said product being produced in accordance with the method of claim 1.

13. A dog food according to claim 12, wherein the dry gravy-forming agent is carboxy methyl cellulose.

References Cited in the file of this patent

UNITED STATES PATENTS

| | | |
|---|---|---|
| 1,380,815 | Luft | June 7, 1921 |
| 2,120,138 | Mathews et al. | June 7, 1938 |
| 2,489,267 | Chapin | Nov. 29, 1949 |
| 2,641,547 | Evans | June 9, 1953 |
| 2,853,027 | Graves | Sept. 23, 1958 |
| 2,945,764 | Lanz | July 19, 1960 |
| 3,014,800 | Guidarelli | Dec. 26, 1961 |

Disclaimer 3,119,691.—*Varnum D. Ludington*, Greenwich, Conn., *Robert E. Schara*, Battle Creek, Mich., and *Raymond E. Mohlie*, Scituate, Mass. NOVEL FARINACEOUS ANIMAL FOOD. Patent dated Jan. 28, 1964. Disclaimer filed June 17, 1968, by the assignee, *General Foods Corporation*.

Hereby enters this disclaimer to claim 13 of said patent.
[*Official Gazette November 19, 1968.*]